(12) United States Patent
Kodama et al.

(10) Patent No.: US 9,010,201 B2
(45) Date of Patent: Apr. 21, 2015

(54) MEASUREMENT APPARATUS AND METHOD

(75) Inventors: Yasuteru Kodama, Kanagawa (JP);
Ryujiro Fujita, Kanagawa (JP);
Takehiko Shioda, Kanagawa (JP);
Ryushin Kametani, Kanagawa (JP)

(73) Assignee: Pioneer Corporation, Kanagawa (JP)

( * ) Notice: Subject to any disclaimer, the term of this patent is extended or adjusted under 35 U.S.C. 154(b) by 26 days.

(21) Appl. No.: 13/880,881

(22) PCT Filed: Oct. 22, 2010

(86) PCT No.: PCT/JP2010/068763
§ 371 (c)(1),
(2), (4) Date: Apr. 22, 2013

(87) PCT Pub. No.: WO2012/053114
PCT Pub. Date: Apr. 26, 2012

(65) Prior Publication Data
US 2013/0205916 A1    Aug. 15, 2013

(51) Int. Cl.
*G01L 1/12* (2006.01)
*G01L 3/10* (2006.01)
*A63B 24/00* (2006.01)
(Continued)

(52) U.S. Cl.
CPC ............. *G01L 3/101* (2013.01); *A63B 24/0062* (2013.01); *A63B 2220/16* (2013.01); *A63B 2220/51* (2013.01); *A63B 2220/58* (2013.01); *B62J 99/00* (2013.01); *B62M 3/00* (2013.01); *B62M 6/50* (2013.01); *G01L 3/1457* (2013.01); *G01L 5/162* (2013.01); *G01L 3/02* (2013.01); *B62J 2099/002* (2013.01); *B62J 2099/0013* (2013.01); *A63B 69/16* (2013.01); *A63B 71/0619* (2013.01); *A63B 2220/805* (2013.01); *A63B 2225/20* (2013.01)

(58) Field of Classification Search
USPC ...................................... 73/862.69
See application file for complete search history.

(56) References Cited

U.S. PATENT DOCUMENTS 7,806,006 B2 * 10/2010 Phillips et al. ........... 73/862.338
8,117,923 B2 *  2/2012 Sasaki ....................... 73/862.49
2007/0145709 A1  6/2007 Matsumoto

FOREIGN PATENT DOCUMENTS

JP    6-317601    11/1994
JP    7-096877    4/1995
(Continued)

OTHER PUBLICATIONS

International Search Report, PCT/JP2010/068763, Jan. 25, 2011.

*Primary Examiner* — Lisa Caputo
*Assistant Examiner* — Octavia Hollington
(74) *Attorney, Agent, or Firm* — Young & Thompson

(57) ABSTRACT

A measurement module that measures force being applied to a man-powered machine includes: a strain sensor that detects strain of a crank of the bicycle configured to transmit force being applied from a user through the crank and one front gear selected among one or more front gears; an MM magnetic sensor that detects the crank passing through a predetermined position; and an MM control part. The MM control part calculates a rotation angle of the crank based on an elapsed time from a time the crank passes through the predetermined position that the sensor has detected, calculates force applied to the crank based on a strain amount of the crank that the strain sensor has detected, associates the rotation angle with the force applied to the crank to calculate distribution of the force applied from the user.

8 Claims, 14 Drawing Sheets

(51) Int. Cl.
*B62J 99/00* (2009.01)
*B62M 3/00* (2006.01)
*B62M 6/50* (2010.01)
*G01L 3/14* (2006.01)
*G01L 5/16* (2006.01)
*G01L 3/02* (2006.01)
*A63B 69/16* (2006.01)
*A63B 71/06* (2006.01)

(56) References Cited

FOREIGN PATENT DOCUMENTS

| | | |
|---|---|---|
| JP | 9-142369 | 6/1997 |
| JP | 10-114293 | 5/1998 |
| JP | 10-291493 | 11/1998 |
| JP | 2000-016367 | 1/2000 |
| JP | 2004-338653 | 12/2004 |
| WO | WO 2004/113157 | 12/2004 |

* cited by examiner

MEASUREMENT APPARATUS AND METHOD

CROSS-REFERENCES TO RELATED APPLICATIONS

This application claims the benefit of PCT International Patent Application No. PCT/JP2010/068763, filed Oct. 22, 2010, which is incorporated herein by reference.

BACKGROUND

1. Technical Field

The present invention relates to a measurement apparatus and a measurement method for measuring force applied to a man-powered machine having a crank, such as a bicycle, an exercise bike and so forth.

2. Related Art

Patent literature 1 discloses a technology for calculating power and calories-out and displaying and recording them, by detecting torque by a magnetostrictor and detecting a crank angle by an optical sensor.

Patent Literature 1: Japanese Patent Application Laid-Open No. 2004-338653

However, with the method disclosed in Patent Literature 1, there is a problem that is it not possible to present the direction and strength of power according to a crank angle.

SUMMARY

It is therefore, an object of the present invention to provide a measurement apparatus and a measurement method that can present the direction of power according to a crank angle.

The measurement apparatus for measuring force being applied to a man-powered machine includes: a strain detecting part that detects strain of a crank of the man-powered machine configured to transmit force being applied from a user through the crank and one gear selected among one or more gears; a sensor that detects the crank passing through a predetermined position; and a control part, wherein: the control part calculates a rotation angle of the crank based on an elapsed time from a time the crank passes through the predetermined position that the sensor has detected; the control part calculates force applied to the crank based on a strain amount of the crank that the strain detecting part has detected; and the control part associates the rotation angle with the force applied to the crank to calculate distribution of the force applied from the user.

The measurement method for measuring force being applied to a man-powered machine includes: detecting strain of a crank of the man-powered machine configured to transmit force being applied from a user through the crank and one gear selected among one or more gears; detecting the crank passing through a predetermined position; calculating a rotation angle of the crank based on an elapsed time from a time the crank passes through the predetermined position; calculating force applied to the crank based on a strain amount of the crank; and associating the rotation angle with the force applied to the crank to calculate distribution of the force applied from the user.

DESCRIPTION OF EXEMPLARY EMBODIMENTS

Embodiment 1

Figure 1:
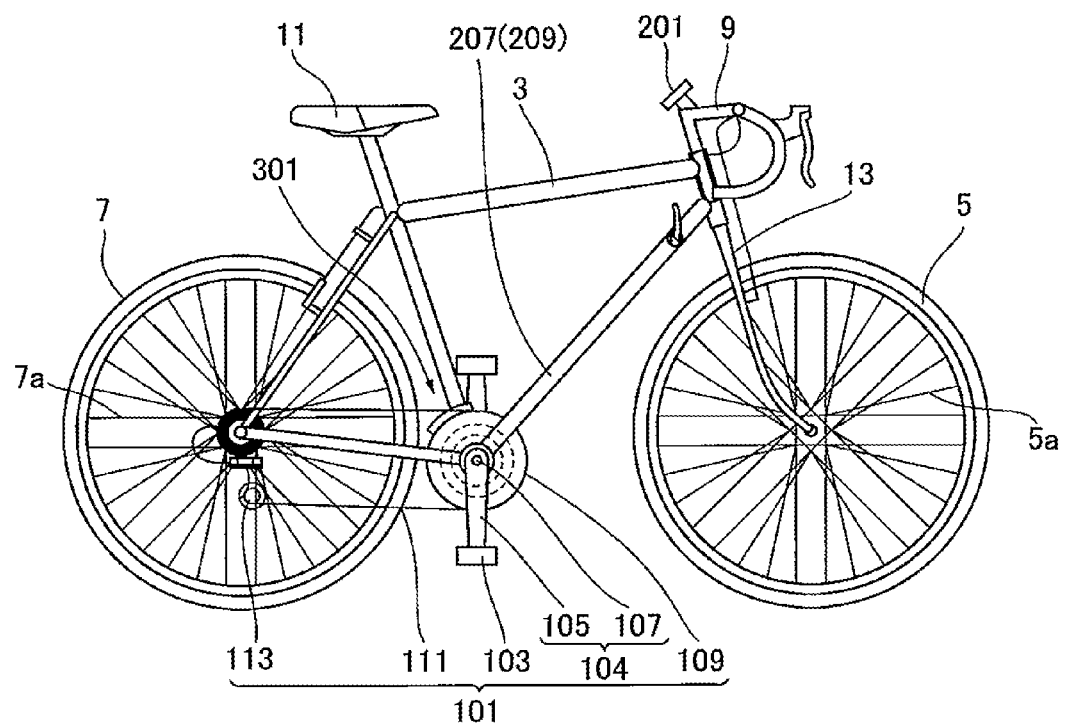
FIG. 1 is an overall view of a bicycle according to Embodiment 1 of the present invention.

FIG. 1 is an overall view of a bicycle 1 according to Embodiment 1 of the present invention.

As shown in FIG. 1, the bicycle 1 includes a frame 3, a front wheel 5, a rear wheel 7, a handle 9, a saddle 11, a front fork 13 and a drive mechanism 101. The frame 3 is constituted by two trusses. The front fork 13 is rotatably connected to the front of the frame 3. The front fork 13 is connected to the handle 9. The front wheel 5 is rotatably connected to the lower end of the front fork 13. The front wheel 5 has a hub part, a spoke part and a tire part. The hub part is rotatably connected to the front fork 13. Then, the hub part and the tire part are connected through the spoke part. The rear end of the frame 3 is rotatably connected to the rear wheel 7. The rear wheel 7 has a hub part, a spoke part and a tire part. The hub part is rotatably connected to the frame 3. The hub part and the tire part are connected through the spoke part. The hub part of the rear wheel 7 is connected to a rear gear 113.

The bicycle 1 has a drive mechanism 101 that converts stepping force applied from a foot of the user into a force to drive the bicycle 1. The drive mechanism 101 includes a pedal 103, a crank mechanism 104, a front gear 109, a chain 111 and a rear gear 113. The pedal 103 is used to be stepped in contact with the user's foot.

Figure 4:
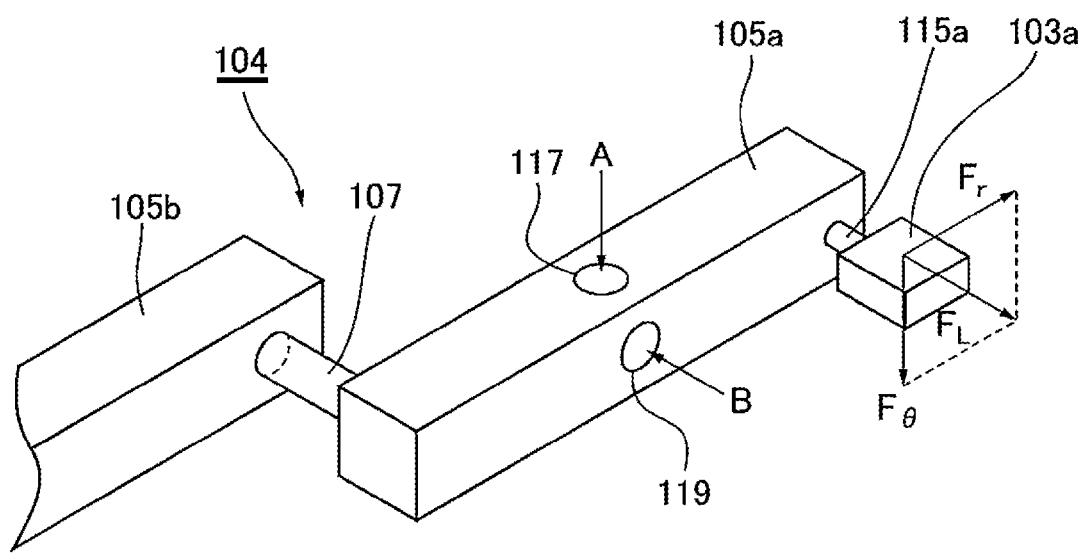
FIG. 4 is a drawing explaining force applied to a right crank.

The crank mechanism 104 is constituted by a crank 105, a crankshaft 107 and a pedal crankshaft 115 (shown in FIG. 4). To be more specific, the crankshaft 107 penetrates the frame 3 in the horizontal direction. The crank 105 is perpendicular to the crankshaft 107. The crankshaft 107 is connected to an end of the crank 105. A pedal crankshaft 115 is perpendicular to the crank 105. The axial direction of the pedal crankshaft 115 is the same as the crankshaft 107. The crank 105 is connected to the end of the pedal crankshaft 115 opposite to the end at which the crankshaft 107 is formed. The pedal 103 is rotatably connected to the pedal crankshaft 115. The crankshaft 107 is rotatably supported by the frame 3. The crank mechanism 104 has the same structure as that in the opposite side surface of the bicycle 1. That is, the crank mechanism 104 has two cranks 105, two pedal crankshafts 115 and two pedals 103. In order to distinguish between the right and left of these, hereinafter each component of the crank mechanism 104 will be referred to as a right crank 105a, a left crank 105b, a right pedal crankshaft 115a, a left pedal crankshaft 115b, a right pedal 103a and a left pedal 103b. The right crank 105a and the left crank 105b extend to the opposite sides with respect to the crankshaft 107. The right crank 105a and the left crank 105b are formed on the same plane. The axis of the right crank 105a and that of the left crank 106b are parallel to one another.

The front gear 109 is connected to the crankshaft 107. The front gear 109 is constituted by a plurality of gears and configured to change its gear ratio. The chain 111 is engaged with the front gear 109. The chain 111 is engaged with the rear gear 113. Preferably, the rear gear 113 is also constituted by a plurality of gears and configured to change its gear ratio. The rear gear 113 is connected to the rear wheel 7.

With this drive mechanism 101, the bicycle 1 converts the stepping force applied from the user into the torque of the rear wheel 7.

A measurement module 301 is disposed on the crank 105. In addition, a CC cadence radio receiving part 207 and a CC radio receiving part 209 are disposed on the frame 3. Moreover, the cycle computer (CC) 201 is provided on the handle 9.

Figure 2:
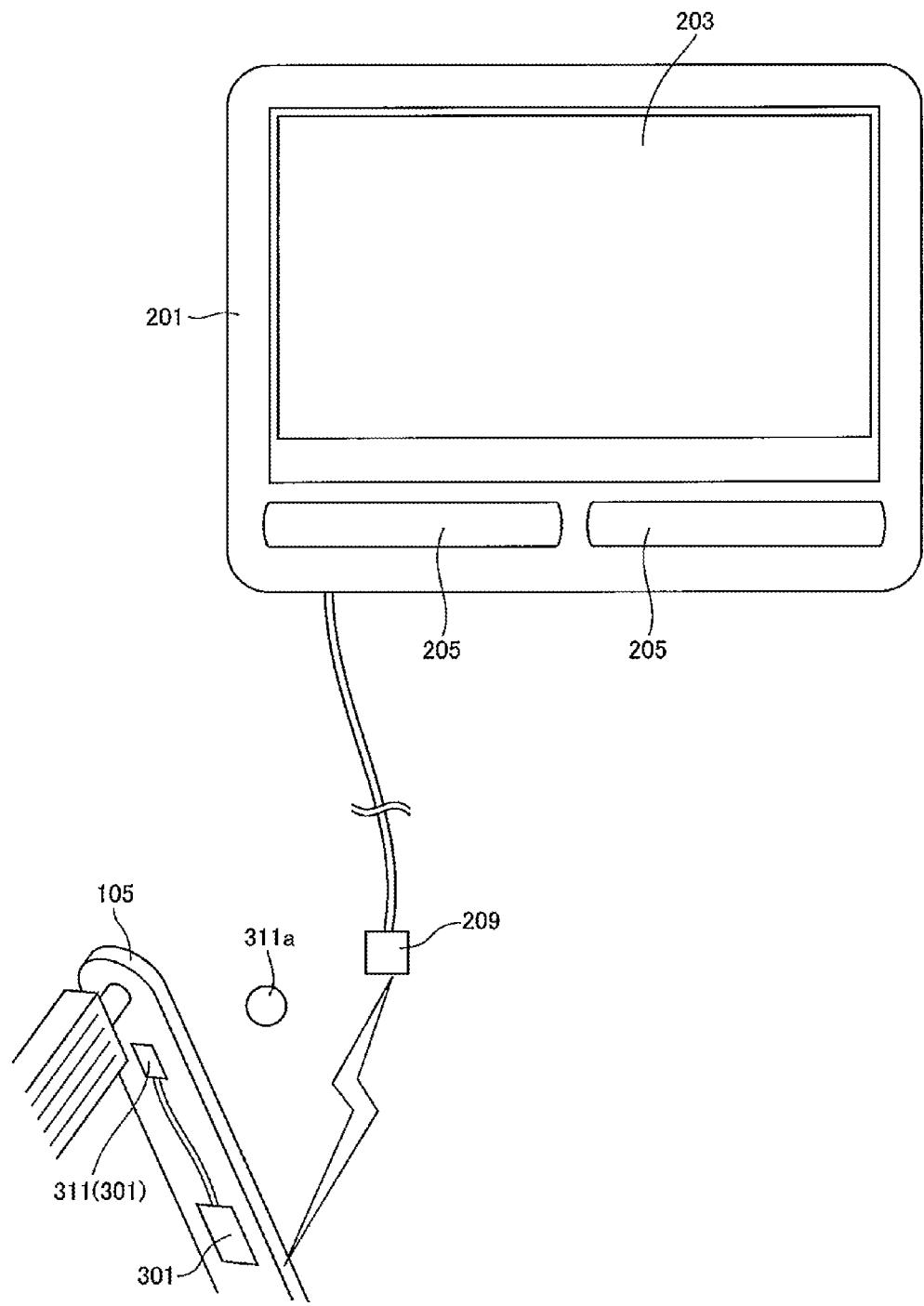
FIG. 2 is a drawing explaining the positional relationship between a cycle computer (CC) and a measurement module (MM)

FIG. 2 is a drawing explaining the positional relationship between the cycle computer (CC) 201 and the measurement module (MM) 301.

As shown in FIG. 2, the cycle computer (CC) 201 includes a CC display part 203 that displays various information and a CC operating part 205 that receives the operation from the user. The various information includes the speed of the bicycle 1, positional information, the distance to the destination, the estimated time of arrival at the destination, the moving distance from the departure point, the elapsed time from the departure time, (average) power, (average) amount of loss and so forth. Here, "power" means an amount of the energy per hour due to the force applied in the direction of the rotation of the crank 105. The bicycle 1 is driven by this power. Meanwhile, "amount of loss" means force applied in a different direction from the direction of the rotation of the crank 105. This force is wasted force that does not contribute to the drive of the bicycle 1 at all. Therefore, the user can more efficiently drive the bicycle 1 by increasing power and decreasing an amount of loss as much as possible.

The CC display part 203 displays the force in the direction of the rotation (torque) outputted by the user, the force in the direction normal to the human power (amount of loss) outputted by the user and so forth, at each angle (every 30 degrees) of the crank 105. Here, with the present embodiment, by dividing 360 degrees by twelve, the force in the direction of the rotation (torque) and the force in the direction normal to the human power outputted by the user (amount of loss) are displayed every 30 degrees. Hereinafter, the number used to divide 360 degrees is presented by "m" (division number). With the present embodiment, m is 12. However, the division into twelve (m=12) is merely an example. The division number may increase or decrease as needed.

The cycle computer (CC) 201 has the CC radio receiving part 209. This CC radio receiving part 209 is connected to the main body of the cycle computer (CC) 201 via a wiring. Here, the CC radio receiving part 209 does not need a function dedicated to receiving. The CC radio receiving part 209 may have a function as a sending part. Hereinafter, if a device is described as "sending part" or "receiving part", the device may have both a receiving function and a sending function.

Figure 3:
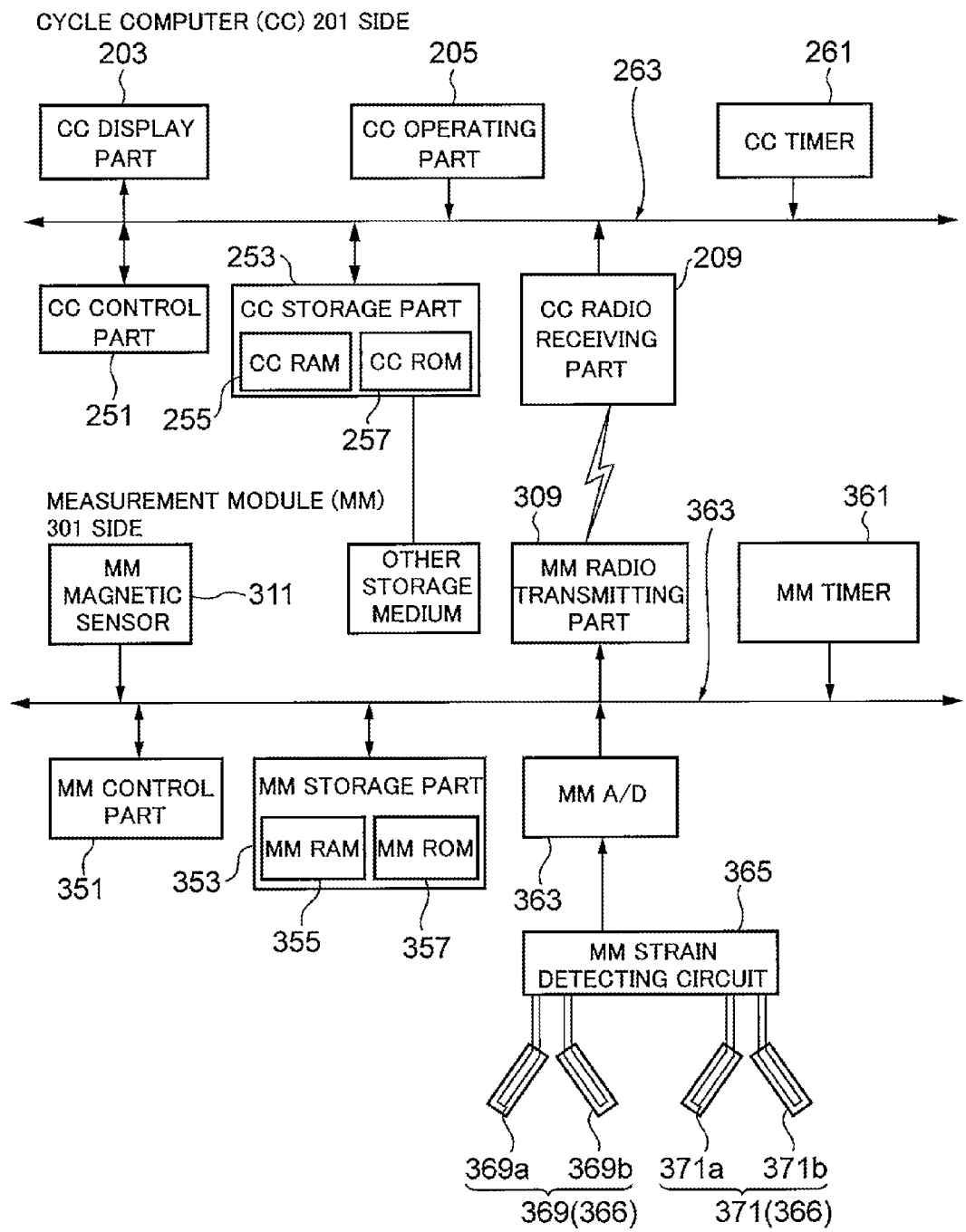
FIG. 3 is a block diagram showing the cycle computer (CC) and the measurement module (MM)

The measurement module (MM) 301 has a MM magnetic sensor 311 includes a reed switch (see also the measurement module (MM) shown in FIG. 3). The MM magnetic sensor 311 detects the position of a magnet 311a based on that the reed switch is turned on due to the magnetic force generated by the magnet 311a approaching the reed switch. Here, the magnet 311a is fixed to a given position of the frame 3. That is, the turn-on of the reed switch of the MM magnetic sensor 311 means that the MM magnetic sensor 311 detects the crank 105 being located at the position (angle) of the magnet 311a on the frame 3. The measurement module (MM) 301 can obtain cadence (rpm) from the MM magnetic sensor 311.

Moreover, the MM magnetic sensor 311 is used to calculate the position (angle) of the crank 105. That is, the rotation angle of the crank 105 is estimated based on information on the position (angle) of the crank 105. The interval in which the MM magnetic sensor 311 is turned on corresponds to the interval in which the crank 105 is rotated 360 degrees. Then, it is possible to estimate the current position of the crank 105 based on the elapsed time from the time the MM magnetic sensor 311 is last turned on. To be more specific, the rotation angle of the crank 105, which is an initial rotation angle of the MM magnetic sensor 311, is calculated by (elapsed time)/(the interval in which the MM magnetic sensor 311 is turned on)×360 degrees. However, with the present embodiment, it is not necessary to record data every angle of the crank 105 (for example, every degree when the angle is finely divided), and therefore 360 degrees are divided by twelve (m=12) to calculate a value every 30 degrees. To be more specific, the average torque (power) and the average amount of loss are calculated every 30 degrees, which is obtained by dividing 360 degrees by twelve (m=12). Then, the measurement module (CC) 301 calculates the average torque and the average amount of loss for each rotation angle of the crank 105 (for each of the interval of 30 degrees), based on the information on the position of the crank 105 from the MM magnetic sensor 311. Here, although with an improved embodiment, the position of the crank 105 may be detected or estimated by the MM magnetic sensor 311 having the magnet 311a and the reed switch, another configuration is possible where the position of the crank 105 is detected by an angle sensor (e.g. rotary encoder and so forth).

The measurement module 301 detects the human power applied from the user to the pedal 103, by using a plurality of strain sensors 366 provided on the crank 105 (see also FIG. 3). To be more specific, the measurement module 301 calculates the average torque (power), which is the turning force of the crank 105 and the average amount of loss.

FIG. 3 is a block diagram showing the cycle computer (CC) 201 and the measurement module (MM) 310. Now, the configuration of the measurement module (MM) 301 will be explained with reference to the lower part of FIG. 3. As shown in the lower part of FIG. 3, the measurement module (MM) 301 has the MM magnetic sensor 311, an MM radio transmitting part 309, an MM timer 361, an MM control part 351, an MM storage part 353, an MM A/D 363, an MM strain detecting circuit 365 and a strain sensor 366.

The strain sensor 366 is attached to the crank 105 to be integrated with the crank 105. Here, the position of the crank 105 at which the strain sensor 366 is attached, will be explained later with reference to FIG. 5. Here, an upper/lower surface strain gage set 369, a side surface strain gage set 371 and so forth are collectively referred to as the strain sensor 366. The upper/lower surface strain gage set 369 includes a first upper/lower surface strain gage 369a and a second upper/lower surface strain gage 369b. The respective terminals of the first upper/lower surface strain gage 369a and the second upper/lower surface strain gage 369b are connected to the MM strain detecting circuit 365. The MM strain detecting circuit 365 amplifies and adjusts the output of the first and second upper/lower surface strain gages 369a and 369b. The output of the first and second upper/lower surface strain gages 369a and 269b having been amplified by the MM strain detecting circuit 365, which is analog information, is converted into strain amount information, which is digital information, by the MM. A/D 363. Then, a strain amount information signal is outputted to the MM storage part 353. The strain amount information signal inputted to the MM storage part 353 is stored in an MM RAM 355, as strain amount information.

Similarly, the side surface strain gage set 371 has a first side surface strain gage 371a and a second side surface strain gage 371b. The respective terminals of the first and second side surface strain gages 371a and 371b are connected to the MM strain detecting circuit 365. The MM strain detecting circuit 365 amplifies and adjusts the output of the first and second side surface strain gages 371a and 371b. The output of the first and second side surface strain gages 371a and 271b having been amplified by the MM strain detecting circuit 365, which is analog information, is converted into strain amount information, which is digital information, by the MM A/D 363. Then, a strain amount information signal is outputted to the MM storage part 353. The strain amount information signal inputted to the MM storage part 353 is stored in the MM RAM 355, as strain amount information.

Here, the time interval in which the MM A/D 363 converts an analog value into a digital value is represented by the following equation.

$$\text{Timer } A(s) = Tk \text{ this time}/n$$

Here, Timer A represents sampling time. The sampling time is a period for which the output of the MM strain detecting circuit 365 is digitally converted. That is, the sampling time is a period of time for which strain amount information is sampled from the output of the strain sensor 366. Then, the torque Tr and the amount of loss for each sampling time is calculated based on the strain amount information for each sampling time. In addition, "Tk this time" represents the period of time from when the MM magnetic sensor 311 detected the magnet 311a approaching at the previous time until the MM magnetic sensor 311 detects the magnet 311a is approaching. That is "Tk this time" is the period of time for which the crank 105 is rotated 360 degrees lately. In addition, n represents the total number of times of sampling. That is, n is the number of times of sampling while the crank 105 is rotated 360 degrees. With the present embodiment, the total number of times of sampling n is 120 (n=120). Moreover, with the present embodiment, 360 degrees are divided by twelve (m=12), and therefore the number of times of sampling for each interval is 10 (n(=120)/m(=12)). Therefore, the average torque and the average amount of loss are calculated by averaging strain amount information every ten times of sampling. Here, there is an advantage that the greater the total number of times of sampling n (n=120) to be averaged, the more the value is stabilized. Moreover, there is an advantage that when the total number of times of sampling n is increased, it is possible to more accurately calculate the average torque and the average amount of loss in a case in which the division number (m=12) is increased. Here, it means that when the total number of times of sampling n is large, the value of the sampling time (Timer A) is small. Therefore, an increase in the total number of times of sampling is likely to surpass the capacity of the MM A/D 363 performing analog-to-digital conversion. In addition, when the total number of times of sampling n is large, the strain amount information to be stored in the MM storage part 353 is increased. Then, in order to hold the increased strain amount information, it is necessary to increase the capacity of the MM storage part 353. Then, if the measurement module (MM) 301 is equipped with the MM storage part 353 with a large capacity, there are problems that the cost and capacity are increased, and the process is complicated. Therefore, the total number of times of sampling n is determined by weighing the division number m, the degree of the accuracy of the average power P and the average amount of loss, the cost, the allowable capacity and so forth. A first timer described later is used to count Timer A.

The MM timer 361 is a timer counter, and consistently counts a clock having a predetermined period. Moreover, the MM timer 361 serves to instruct the MM radio transmitting part 309 about the timing for transmission. To be more specific, the MM timer 361 instructs the MM radio transmitting part 306 about the timing of transmission every ¼ seconds. Here, with the MM timer 361, it is possible to count the first timer and the second timer separately from one another.

The MM radio transmitting part 309 transmits the average torque information and the information on the amount of loss, which are calculated by the MM control part 351 based on the strain amount information, to the CC radio receiving part 209. In addition, the MM radio transmitting part 309 transmits information to associate the position (angle) of the crank 105, which is estimated from the information detected by the MM magnetic sensor 311, with the average torque information and the information on the amount of loss. Moreover, the MM radio transmitting part 309 also transmits cadence information. The MM radio transmitting part 309 transmits the average torque information and the information on the amount of loss; the information to associate these pieces of information with the position (angle) of the crank 105; and the cadence information every ¼ seconds, according to a command from the MM control part 351. However, it is by no means limiting, but ¼ seconds may be varied as needed. Alternatively, the MM control part 351 may output a command based on the value of the MM timer 361 to allow the MM radio transmitting part 309 to transmit the average torque information, the information on the amount of loss, the information to associate these pieces of information with the position (angle) of the crank 105, and the cadence information.

The MM storage part 353 stores various information. Various information includes, for example, the control program of the MM control part 351 and temporary information required for the control by the MM control part 351. With the present embodiment, the MM storage part 353 stores strain amount information in particular. Here, the MM storage part 353 includes MM RAM 355 and the MM ROM 357. The MM RAM 355 stores strain amount information and so forth. Meanwhile, the MM ROM 357 stores the control program, and various parameters, constants and so forth used to calculate the average torque based on the strain amount information.

The MM control part 351 comprehensively controls the measurement module (MM) 301. To be more specific, the MM control part 351 calculates the average torque for a predetermined period of time, based on the strain amount information. First, torque Tr is calculated by the following equation.

$$\text{Torque } Tr(Nm) = mgL(X-Xz)/(Xc-Xz) \quad \text{(Equation 1)}$$

Here, X is measured strain amount; Xc is the strain amount when m(kg) is vertically applied to the pedal 103 while the crank 105 is in the horizontal state; Xz is the strain amount when any load is not applied to the pedal 103; and L is the distance between the crankshaft 107 to the pedal 103. In addition, g represents acceleration of gravity. The average torque is calculated by calculating the torque for each of a plurality of time points and averaging the values. Then, the calculated average torque is transmitted to the cycle computer (CC) 201 via the MM radio transmitting part 309 every other second. To be more specific, when 360 degrees are divided by twelve for display of the CC display part 203, the torque of the crank 105 at each time point within 30 degrees is calculated by using the above-described equation, and averages the plurality of torques within 30 degrees to calculate the average torque. Here, the strain amount information substituted for X is obtained by amplifying the output of the upper/lower surface strain gage set 369 by the MM strain detecting circuit 365 and converting the amplified result into a digital value by the MM A/D 363.

In addition, the MM control part 351 calculates the amount of loss for a predetermined period of time, based on the strain amount information. The amount of loss is calculated by using the following equation.

$$\text{Amount of loss }(N)=mg(Y-Yz)/(Yu-Yz) \quad \text{(Equation 2)}$$

Here, Y is the outputted strain amount; Yu is the strain amount when m (kg) is vertically applied to the pedal 103 while the crank 105 is located at the bottom dead center; and Yz is the strain amount while any load is applied to the pedal 103. In addition, g represents acceleration of gravity. In this way, it is possible to calculate the directional component normal to the human power (amount of loss) based on the amount of the strain in the inward and outward directions. The average loss amount is obtained by calculating the amount of loss for each of a plurality of time points and averaging these. Then, the calculated average amount of loss is transmitted to the cycle computer (CC) 201 via the MM radio transmitting part 309 every other second. To be more specific, when 360 degrees are divided by twelve for display of the CC display part 203, the amount of loss of the crank 105 at each time point within 30 degrees is calculated by using the above-described equation, and averages the plurality of amounts of loss within 30 degrees to calculate the average amount of loss. Here, the strain amount information substituted for Y is obtained by amplifying the output of the side surface strain gage set 371 by the MM strain detecting circuit 365 and converting the amplified result into a digital value by the MM A/D 363.

Moreover, upon receiving the output of an information signal indicating that the MM magnetic sensor 311 is turned on, the MM control part 351 operates as follows. The MM control part 351 commands the MM timer 361 to output the timer value information of the second timer. Then, upon receiving the timer value information of the second timer from the MM timer 361, the MM control part 351 calculates cadence based on the timer value information of the second timer. To be more specific, the MM control part 351 calculates the period of time (s) for which the MM magnetic sensor 311 is turned on, by multiplying the number of counts of the time value information of the second timer by one count interval (the predetermined period of the clock) (T). Then, cadence (rpm) is calculated by dividing 60 by this period of time (s). Moreover, the MM control part 351 stores this cadence information in a storage buffer. Then, the MM control part 351 outputs a command to reset the counter value to the second timer of the MM timer 361.

The MM control part 351 adds information to associate these pieces of information with the position (angle) of the crank 105, to the average torque information and the information on the average amount of loss. Then, the MM control part 351 stores in the transmission buffer the average torque information, the information on the average amount of loss, and the information to associate these pieces of information with the position (angle) of the crank 105. Moreover, the MM control part 351 also stores the cadence information calculated by the MM magnetic sensor 311 in the transmission buffer. Here, the transmission buffer may be the MM RAM 355 of the MM storage part 353, or a storage part and so forth, which is provided in the MM radio transmitting part 309.

Next, the configuration of the cycle computer (CC) 201 will be explained with reference to the upper part of FIG. 3. As shown in the upper part of FIG. 3, the cycle computer (CC) 201 includes the CC display part 203, the CC operating part 205, the CC radio receiving part 209, the CC timer 261, the CC storage part 253 and the CC control part 251.

The CC operating part 205 receives an instruction (input) from the user. For example, the CC operating part 205 receives an instruction on the contents to be displayed on the CC display part 203 from the user. To be more specific, the CC operating part 205 receives a method of displaying the average power and the average amount of loss on the CC display part 203, the division number m, and so forth, as input.

The CC display part 203 displays various information, according to the instructions from the user. To be more specific, the CC display part 203 visually displays the average power and the average amount of loss of the crank 105 every 30 degrees. Here, how to visually display is not limited. Visual display may be achieved by using, for example, vectors, graphs, colors, symbols, 3D and so forth. Moreover, combinations of these are possible.

The CC radio receiving part 209 receives the average torque information, the information on the average amount of loss, and the information to associate these pieces of information with the position (angle) of the crank 105. In addition, the CC radio receiving part 209 also receive cadence information.

The CC timer 261 is a timer counter and consistently counts a clock having a predetermined period. The timer value information generated by the CC timer 261 is used by the CC control part 251 and so forth in various ways.

The CC storage part 253 stores various information. Various information includes, for example, the control program of the CC control part 251, and temporary information that is required for the control by the CC control part 251. Here, the CC storage part 253 includes the CC RAM 255 and the CC ROM 257. The CC ROM 257 stores the control program and various parameters, constants and so forth. Meanwhile, the CC ROM 257 stores various parameters, constants and so forth to calculate the average power from the average torque information.

The CC control part 251 comprehensively controls the cycle computer (CC) 201. In addition, the CC control part 251 may comprehensively control the measurement module (MM) 301. The CC control part 251 calculates average power P. To be more specific, the CC control part 251 calculates the average power P for a predetermined period of time, based on the average torque information and the cadence information. The average power P can be calculated by the following equation.

$$\text{Average power }P(W)=(2PI/60)Tra\times R \quad \text{(Equation 3)}$$

Here, Tra represents average torque (Nm), and R represents cadence (rpm). PI represents circular constant. That is, it is possible to calculate the average power P by substituting the average torque information for Tra and substituting the cadence information for R. With the present embodiment, when 360 degrees are divided by twelve for display of the CC display part 203, the CC control part 251 calculates the average power every 30 degrees.

Moreover, the CC control part 251 performs processing to visually display the average power and the average amount of loss every 30 degrees. Then, the CC display part 203 displays the result of the processing by the CC control part 251.

FIG. 4 is a drawing explaining the force applied to the right crank 105*a*.

As shown in FIG. 4, the crank mechanism 104 is constituted by the left pedal 103*b*, the left crank 105*b*, the crankshaft 107, the right crank 105*a*, the right pedal crankshaft 115*a* and the right pedal 103*a*. Human power FL of the user is applied to the right pedal 103*a*. The human power FL is constituted by force Fθ in the direction of the rotation of the crank 105 and force Fr in the direction normal to the crank 105. Here, the direction perpendicular to Fθ and Fr is defined as "inward and outward direction. Hereinafter, the strain of the crank 105 that is generated in the direction of the rotation of the crank 105 is referred to as "rotational strain." In addition, the strain of the crank 105 that is generated in the inward and outward direction is referred to as "internal and external strain." Moreover, the strain due to the torsion in the crank 105 is referred to as "torsional strain." The center of the upper surface (or lower surface) of the right crank 105*a* is referred to as "upper/lower surface portion 117." The center of the side surface of the right crank 105*a* is referred to as "side surface portion 119." The upper/lower surface strain gage set 369 is attached to the upper/lower surface portion 117. Meanwhile, the side surface strain gage set 371 is attached to the side surface portion 119.

Figure 5:
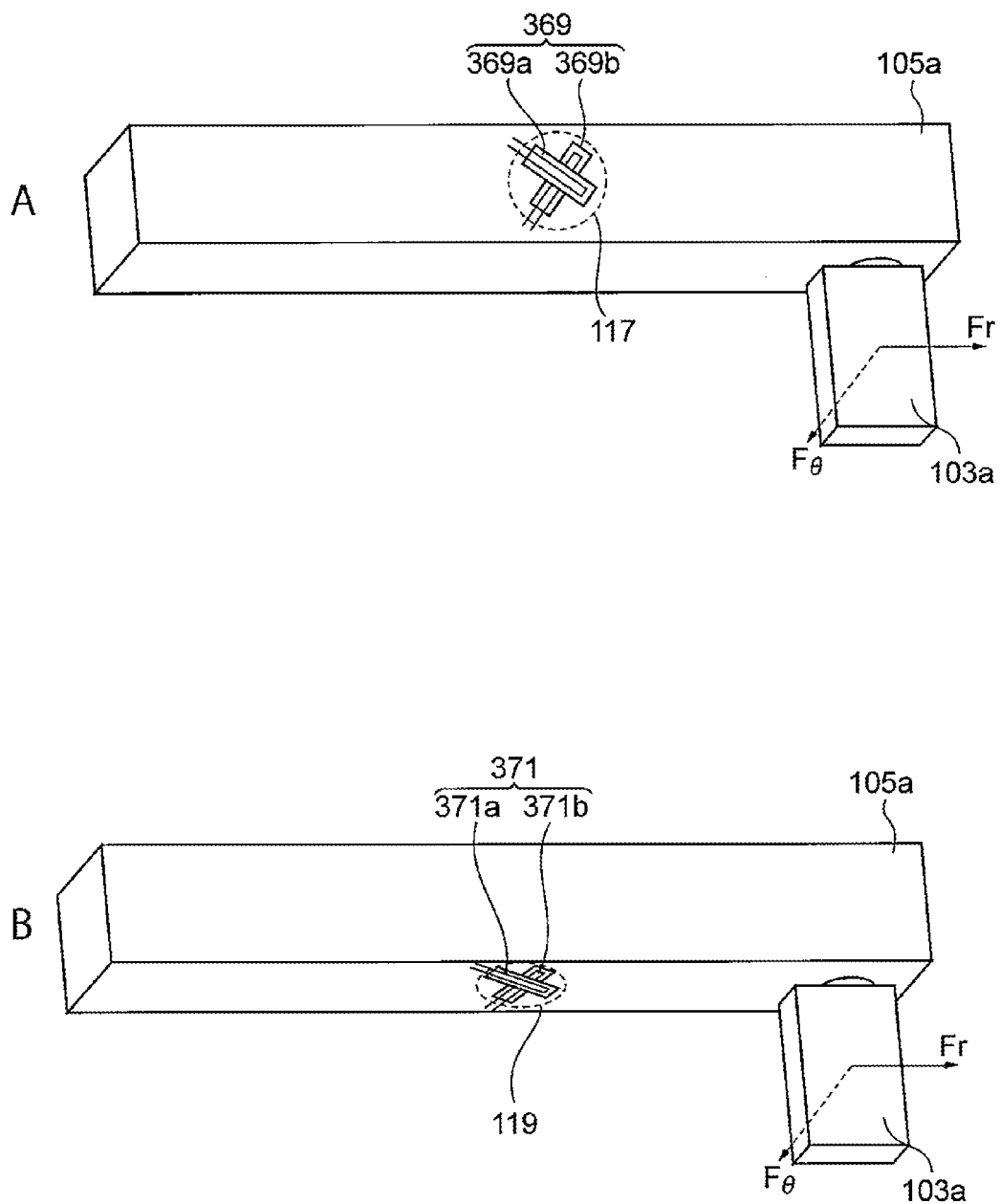
FIG. 5 is a drawing explaining the arrangement of an upper/lower surface strain gage set and the arrangement of a side surface strain gage set.

FIG. 5 is a drawing explaining the arrangement of the upper/lower surface strain gage set 369 and the arrangement of the side surface strain gage set 371.

As shown in FIG. 5A, the upper/lower surface strain gage set 369 is disposed on the upper/lower surface portion 117. The first upper/lower surface strain gage 369*a* and the second upper/lower surface strain gage 369*b* are orthogonal to one another. That is, the direction in which the first upper/lower surface strain gage 369*a* detects strain and the direction in which the second upper/lower surface strain gage 369*b* detects strain are orthogonal to one another. The line extending from the point at which the direction in which the first upper/lower surface strain gage 369 detects strain and the direction in which the second upper/lower surface strain gage 369 detects strain intersect is in the longitudinal direction of the crank 105. That is, the angle between the direction in which the first upper/lower surface strain gage 369*a* detects strain and the axial direction of the crank 105 is 45 degrees.

As shown in FIG. 5B, the side surface strain gage set 371 is disposed on the side surface portion 119. The first side surface strain gage 371*a* and the second side surface strain gage 371*b* are orthogonal to one another. That is the direction in which the first side surface strain gage 371*a* detects strain and the direction in which the second side surface strain gage 371*b* detects strain are orthogonal to one another. Moreover the line extending from the point at which the direction in which the first side surface strain gage 371*a* detects strain and the direction in which the second side surface strain gage 371*b* detects strain intersect is in the longitudinal direction of the crank 105. That is, the angle between the direction in which the first side surface strain gage 371*a* detects strain and the axial direction of the crank 105 is 45 degrees.

Figure 6:
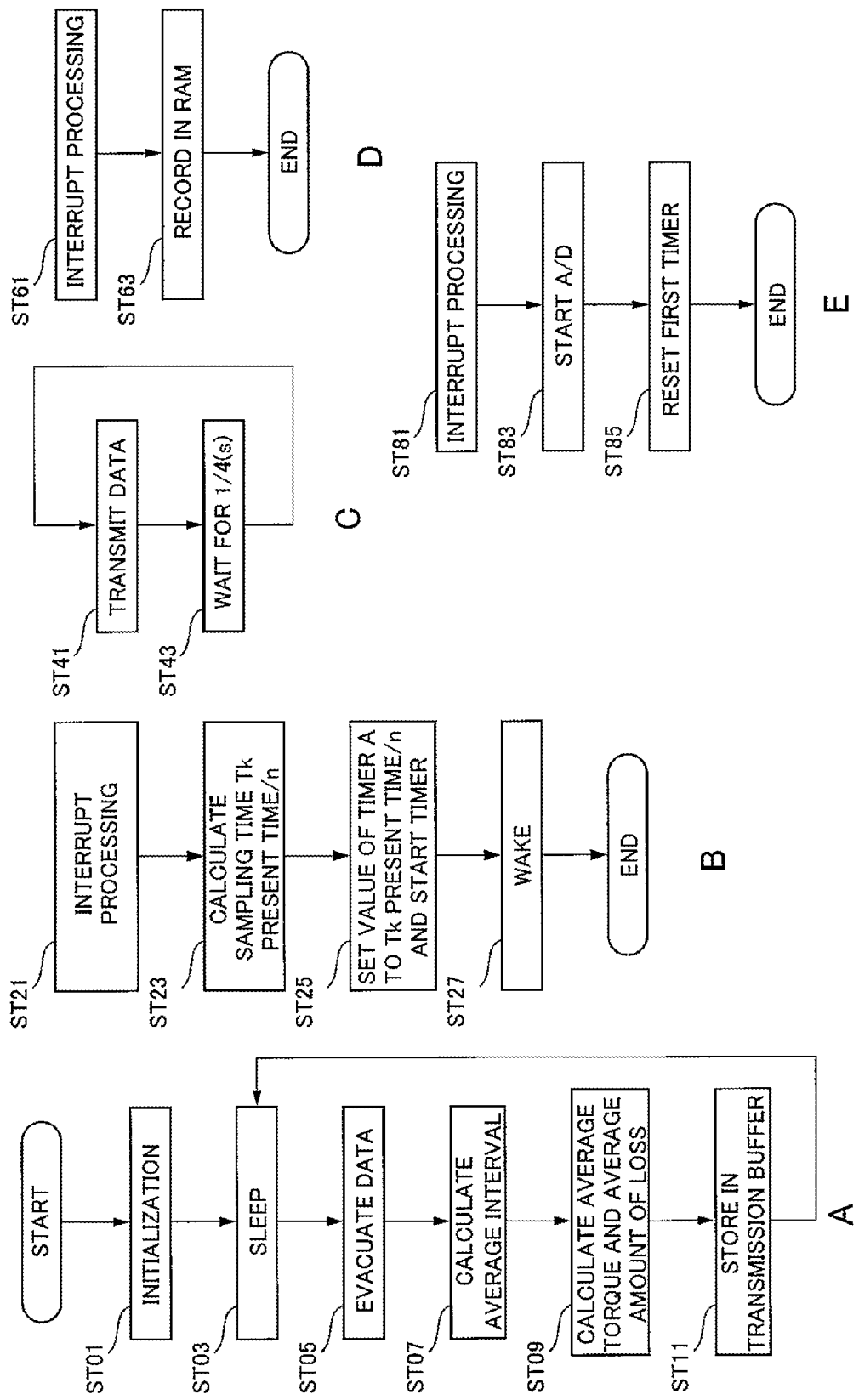
FIG. 6 is a flowchart of processing by the measurement module (MM)

FIG. 6 is a flowchart of processing by the measurement module (MM) 301. FIG. 6A shows the main flow of processing by the MM control part 351.

In step ST01, the system is initialized.

In step ST03, the MM control part 351 performs sleep processing. The sleep processing means that the processing is stopped until wake processing is performed in step ST27 shown in FIG. 6B described later.

In step ST05, the MM control part 351 evacuates data such as strain amount information from the MM RAM 355. This reason will be described. First, the capacity of the MM RAM 355 of the MM storage part 353 is limited. If the capacity of the MM RAM 355 would be increased, data such as strain amount information would not need to be evacuated. However, this causes an increase in the cost and therefore is not reasonable. Second, the strain amount information is written continuously, and therefore, if data is not evacuated, new information could be overwritten before the average torque is calculated in the processing of step ST09 described later.

In step ST07, the MM control part 351 calculates an averaged interval. To be more specific, the MM control part 351 calculates an averaged sampling interval (the number of times of sampling used for averaging). Assuming that the crank speed and the gear ratio are not changed, when data are sampled at 120 points through 360 degrees, and the 360 degrees are divided by twelve, the number of times of sampling for the averaged interval is represented as:

$$n(=120)/m(=12)=10 \text{ (the number of times of sampling)}.$$

In step the ST09, the MM control part 351 calculates the average torque and the average amount of loss. To be more specific, the MM control part 351 performs the same processing as the processing having been described with reference to FIG. 3 to calculate torques and amounts of loss. Then, the MM control part 351 averages the torques and the amounts of loss every number of times of sampling for the averaged interval (n/m), which is calculated in the step ST07 to obtain the average torque and the average amount of loss. Moreover, the MM control part 351 adds the information to associate the calculated average torque and average amount of loss with the position (angle) of the crank 105, to the calculated average torque and average amount of loss. In addition, the MM control part 351 performs the same processing as the processing having been described with reference to FIG. 3 to calculate cadence.

In step ST11, the MM control part 351 stores the various information calculated in the step ST09 in the transmission buffer. To be more specific, the transmission buffer stores the average torque information, the information on the average amount of loss, and the information to associate these pieces of information with the position (angle) of the crank 105. Moreover, the transmission buffer also stores the cadence information. After this processing, the MM control part 351 returns the step to the step ST03 to move to the sleep mode and stops the processing until the wake processing.

FIG. 6B is a flowchart of an interrupt routine by the MM magnetic sensor 311. Upon detecting the output of the MM magnetic sensor 311 (detecting the magnet 311*a* approaching), the MM control part 351 interrupts the step to start the following processing (step ST21). Here, "interrupt" means stopping the current processing to perform designated processing.

In step ST23, the MM control part 351 calculates sampling time "Timer A." To be more specific, the sampling time Timer A is calculated by the following equation (also refer to the description of the MM A/D 363 with reference to FIG. 3).

Timer $A(s) = Tk$ this time/$n$

Here, n represents the number of times of sampling 120, and Tk this time represents the time interval for which the crank 105 is rotated 360 degrees last time. With this equation, it is understood that data acquisition per Timer A means data acquisition with a temporal resolution at which 360 degree rotation of the crank 105 is divided by 120.

In step ST25, the MM control part 351 sets Timer A to the value calculated in the step ST23.

In step ST27, the MM control part 351 performs wake processing. To be more specific, the steps following the step ST05 shown in FIG. 6A are performed. Upon detecting the output of the MM magnetic sensor 311 again after ending the processing, the MM control part 351 starts the steps following the step ST23.

FIG. 6C is a flowchart of the processing by the MM radio transmitting part 309. In step ST41, the MM radio transmitting part 309 transmits the average torque information and the information on the amount of loss stored in the transmission buffer, to the CC radio receiving part 209. To be more specific, the transmission buffer stores the average torque information, the information on the amount of loss, and the information to associate these pieces of information with the position (angle) of the crank 105. Moreover, the transmission buffer also stores the cadence information.

In step ST43, the MM radio transmitting part 309 waits for ¼ seconds. Here, this waiting time is variable as needed. After ending the processing in the step ST43, the MM radio transmitting part 309 returns the step to the step ST41. That is, the processing in the step ST41 is performed every other ¼ seconds.

FIG. 6D is a flowchart of the processing by the MM storage part 353. In step ST 61, after the MM A/D 363 ends A/D conversion, the MM storage part 353 interrupts the processing.

In step ST63, the MM storage part 353 stores the strain amount information converted to a digital value by the MM A/D 363 in the MM RAM 355. Then the processing is ended.

FIG. 6E is a flowchart of the processing by the MM A/D 363. In step ST81, the MM A/D 363 is interrupted by Timer A. To be more specific, the MM A/D 363 receives the interrupt when the value of the first timer of the MM timer 361 is the same as the value of Timer A. Then, the MM A/D 363 performs the step following the step ST 83.

In step ST83, the MM A/D 363 performs A/D conversion (analog-to-digital conversion). Here, the A/D conversion is applied to the information on the strain of the upper/lower surface strain gage set 369 and the strain of the side surface strain gage set 371, which is outputted by the MM strain detecting circuit 365. This A/D conversion by the MM A/D 363 allows the measurement module (MM) 301 to acquire the information on the strain amounts of the upper/lower surface strain gage set 369 and the side surface strain gage set 371 as digital values.

Figure 7:
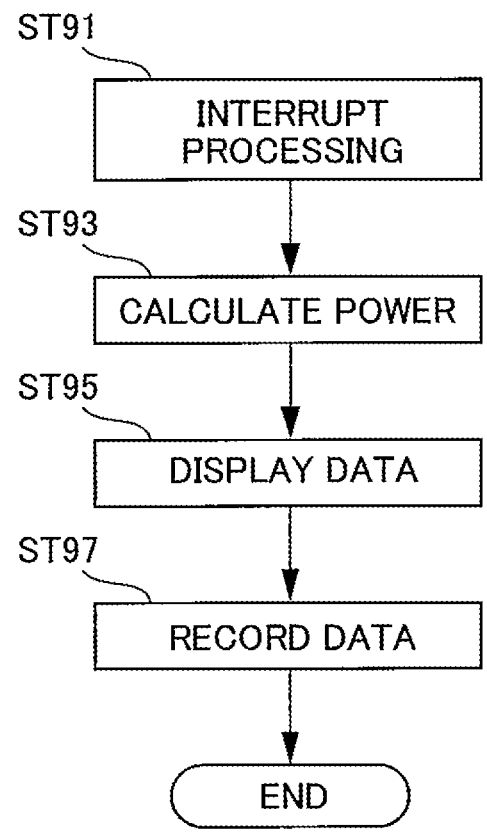
FIG. 7 is a flowchart of processing by the cycle computer (CC)

FIG. 7 is a flowchart of the processing by the cycle computer (CC) 201.

Instep ST91, upon receiving the average torque information, the information on the average amount of loss and the cadence information, the CC control part 251 performs interrupt processing. Here, the information on the position (angle) of the crank 105 is added to the average torque information and the information on the average amount of loss. That is, at the time the CC control part 251 detects the CC radio receiving part 209 receiving the average torque information, the information on the average amount of loss and the cadence information, the CC control part 251 interrupts the processing, and starts the steps following step ST 93.

In the step ST93, the CC control part 251 calculates average power P. To be more specific, the CC control part 251 calculates the average power P for a predetermined interval, based on the average torque information and the cadence information. The average power P is calculated by the following equation.

Average power $P(W) = (2PI/60) Tra \times R$

Here, Tra represents average torque (Nm), and R represents cadence (rpm). That is, the average torque information and the cadence information are substituted for Tra and R, respectively, so that it is possible to calculate the average power P.

In step ST 95, the CC control part 251 performs computation and so forth to visually display the angle of the crank 105 every 30 degrees, the average power, and the average amount of loss. Then, the CC control part 251 displays the visual contents on the CC display part 203 based on the result of the computation. Here, how to visually display is not limited. Visual display may be achieved by using, for example, vectors, graphs, colors, symbols, 3D and so forth.

In step ST97, the CC control part 251 stores in the CC storage part 253 the result of the calculation or computation in the step ST93 and the ST95. Then, the cycle computer (CC) 201 does not start the processing until the interrupt is performed again in the step ST91.

As described above, with the present embodiment, it is possible to display the average power and the average amount of loss that correspond to the position of the crank 105. With this configuration according to the present embodiment, it is possible to provide the user with information about how the user applies force to the pedal 103. By this means, it is possible to help the user to improve pedaling technique.

Figure 8:
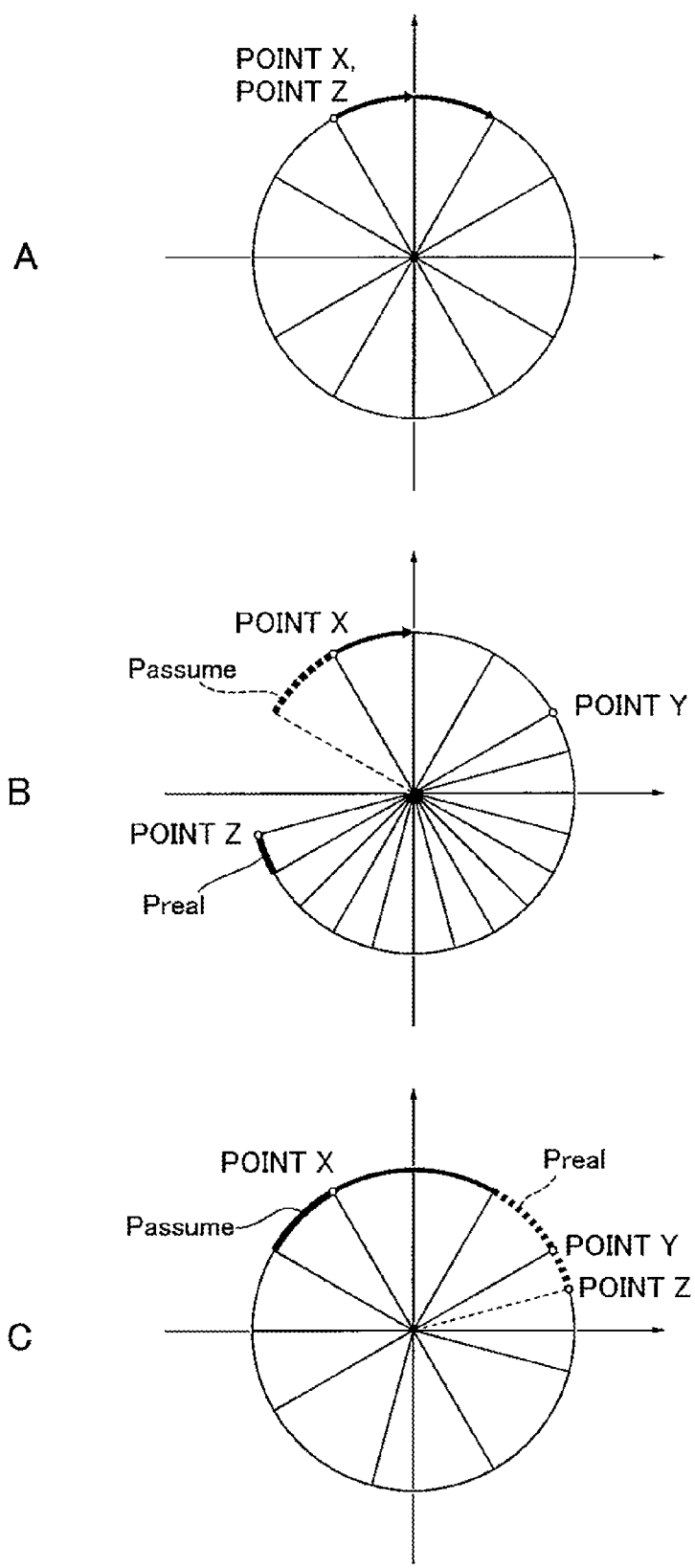
FIG. 8 is a drawing explaining changes in the rotation speed of the crank.

FIG. 8 is a drawing explaining changes in the rotation speed of the crank 105.

As shown in FIG. 8A, when the rotation speed of the crank 105 is fixed, 120 points of sampling are arranged at even intervals through 360 degrees. That is, the number of times of sampling is ten every 30 degrees. Here, it is assumed that the magnet 311a is disposed at point X. However, with this configuration, even if the number of times of sampling is not changed, when the rotation speed of the crank 105 decreases or increases, the rotation angle of the crank 105 varies. It is because Timer A (sampling time) is not changed until the crank 105 rotates 360 degrees and therefore reaches the magnet 311, and the processing in the step ST25 shown in FIG. 6B ends. The rotation angle of the crank 105 varies even if the number of times of sampling is not changed (ten). To be more specific, for example, in a case in which the number of the rotations of the crank 105 decreases by half along the way, the crank 105 can only rotate 15 degrees even if the number of times of sampling is not changed (ten). In contrast, in a case in which the number of the rotations of the crank 105 increases by half along the way, the crank 105 can rotate 45 degrees even if the number of times of sampling is not changed (ten). With this configuration, the cycle computer (CC) 201 or the measurement module (MM) 301 cannot detect the variations in the rotation angle of the crank 105.

FIG. 8B is a drawing explaining a case in which the rotation speed of the crank 105 decreases. To be more specific, FIG. 8B shows a case in which the magnet 311a is located at the point X, and the rotation speed of the crank 105 is not changed after passing through the point X until reaching point Y.

Therefore, it is possible to calculate the average power and the average amount of loss every 30 degrees until the point Y even if the number of times of sampling is ten every 30 degrees. However, in a case in which the rotation speed of the crank 105 decreases half from the point Y while the number of times of sampling is ten every 30 degrees, the crank 105 only can rotate 15 degrees, and therefore it is only possible to detect the data up to point Z even if the number of times of sampling for the twelve intervals is performed. Moreover, the cycle computer (CC) 201 mistakes the data at the point X for the data at the point Z. As a result, the cycle computer (CC) 201 cannot correctly display the average power and the average amount of loss. That is, there is a problem that the cycle computer (CC) 201 performs calculation and display, mistaking the average power and the average amount of loss at point "Preal" for the average power and the average amount of loss at point "Passume."

FIG. 8C shows a situation in which the magnet 311a is set at the point X, and the rotation speed of the crank 105 is not changed after the crank 105 passes through the point X until reaching the point Y. Therefore, it is possible to calculate the average power and the average amount of loss every 30 degrees even if the number of times of sampling is ten every 30 degrees. However, if the rotation speed of the crank 105 doubles after the crank 105 has passed through the point Y, the crank 105 can rotate 45 degrees, and therefore reaches the point Z while the number of times of sampling for the twelve intervals is performed. Moreover, the cycle computer (CC) 201 mistakes the data at the point X for the data at the point Z. This causes a problem that the cycle computer (CC) 201 cannot correctly display the average power and the average amount of loss.

Meanwhile, as shown in FIG. 8B, if the rotation speed of the crank 105 decreases, strain amount information is continuously accumulated in the MM storage part 353 (see also FIG. 8D). As a result, if the MM storage part 353 has the capacity corresponding to the total number of times 120 of sampling, the MM storage part 353 would overflow with the data. To prevent this, with the present embodiment, the MM storage part 353 (MM RAM 355) has a large capacity. That is, with the present embodiment, the MM storage part 353 (MM RAM 355) with a large capacity is employed. By this means, it is possible to prevent overflow.

Embodiment 2

With the above-described Embodiment 1, a configuration has been explained where the MM storage part 353 (MM RAM 355) with a capacity large enough to prevent overflow is employed. However, if the MM storage 353 (MM RAM 355) with a too large capacity is employed, the cost increases. In addition, if the capacity is simply increased, it is not possible to solve the problem that the cycle computer (CC) 201 cannot correctly display the average power and the average amount of loss. Therefore, with Embodiment 2, to solve these problems, the measurement module (MM) 301 is provided with a gear change detecting part 381.

Figure 9:
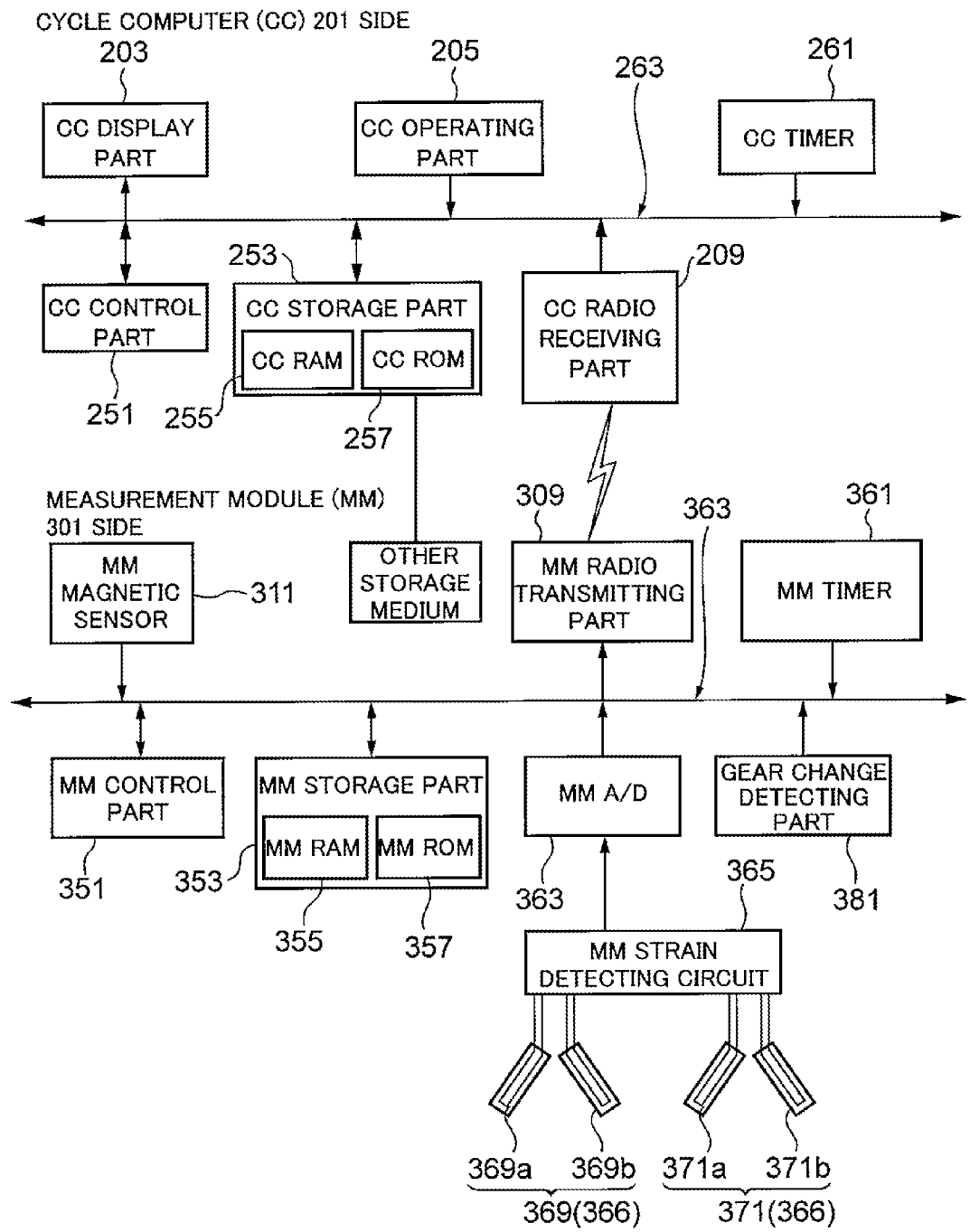
FIG. 9 is a block diagram showing the cycle computer (CC) and the measurement module (MM) according to Embodiment 2.

FIG. 9 shows a block diagram showing the cycle computer (CC) 201 and the measurement module (MM) 301 according to Embodiment 2.

FIG. 9 is basically the same as FIG. 3, and therefore overlapping descriptions will be omitted. As shown in FIG. 9, the measurement module (MM) 301 has a gear change detecting part 381. The gear change detecting part 381 can detect a gear change. Here, the gear change detecting part can simply detect whether or not there is a gear change, but cannot detect the changed content.

The reason why the gear change detecting part 381 is provided is that it is assumed that there is a gear change if the rotation speed of the crank 105 is significantly changed. Here, when the speed of the bicycle 1 is significantly changed, the rotation speed of the crank 105 is also significantly changed. However, normally, the speed of the bicycle 1 is not rapidly changed, and therefore it is assumed that the speed of the bicycle 1 is mostly unchanged here.

With Embodiment 2, the gear change detecting part 381 detects whether or not there is a gear change, and the following control is performed. Here, with Embodiment 2, it is assumed that the gear has two states. Here, a gear ratio is defined as a ratio between the greater number of teeth of a gear and the smaller number of teeth of a gear. Here, for example, the gear ratio is two.

As described above, if a change in the rotation speed of the crank 105 is caused by the gear change, the capacity required for the MM storage part 353 (MM RAM 355) is the total number of times of sampling×the gear ratio. With this capacity, even if the rotation speed of the crank 105 is decreased due to the gear change just after the crank 5 passes through the point X as shown in FIG. 8B, it is possible to prevent the MM storage part 353 (MM RAM 355) from overflowing with data until the crank 105 reaches the point X again. By this means, it is possible to reduce the capacity of the MM storage part 353 (MM RAM 355) and therefore reduce the cost.

Figure 10:
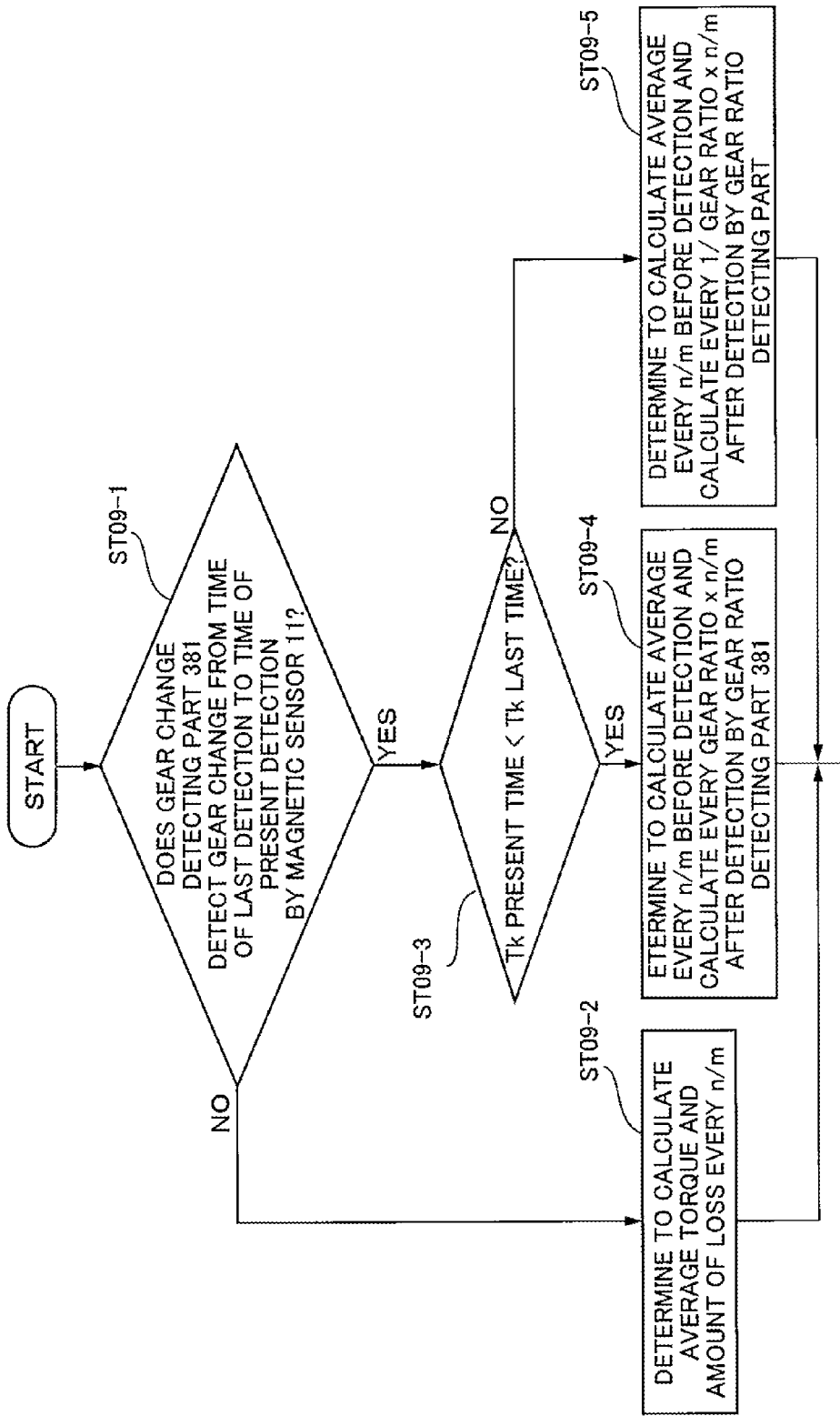
FIG. 10 is a drawing showing the processing in step ST09 shown in FIG. 6 according to Embodiment 2.

FIG. 10 is a drawing explaining the processing in the step ST09 shown in FIG. 6, according to Embodiment 2. The other parts are the same as in Embodiment 1.

The processing in the step ST09 is performed as shown in FIG. 10. In step ST09-1, the MM control part 351 determines whether or not the gear change detecting part 381 detects a gear change from the detection by the MM magnetic sensor 311 at the last time until the detection by the MM magnetic sensor 311 at this time. Here, the data detected at this time has already been detected, and the data detected at the last time was detected last before this time. Then, determining that the gear change detecting part 381 does not detect any gear change, the MM control part 351 moves the step to step ST09-2. On the other hand, when determining that the gear change detecting part 381 detects a gear change, the MM control part 351 moves the step to step ST09-3. In addition, with Embodiment 2, the average power and the average amount of loss are calculated for the 360-degree rotation at the last time after the crank 5 passes through the magnet 311a, and the respective values are displayed on the CC display part 203.

In the step ST09-2, the MM control part 351 determines to calculate the average torque and the average amount of loss every n/m(120/12=10). The number of times of sampling does not need to be changed because the gear change detecting part 381 does not detect any gear change. If the step ST09-2 is performed, the processing in the step 09 by the MM control part 351 is ended.

In the step ST09-3, the MM control part 351 compares between Tk last time, which is the period of time for which the crank 105 rotated 360 degrees last time, and Tk this time, which is the period of time for which the crank 105 rotated 360 degrees at present. Then, determining that Tk last time<Tk this time, the MM control part 351 moves the step to step ST09-4. On the other hand, determining that Tk last time>Tk this time, the MM control part 351 moves the step to step ST09-5.

In the step ST09-4, the MM control part 351 determines to calculate the average torque and the average amount of loss every n/m(120/12=10) until the gear change detecting part 381 detects a gear change. Moreover, the MM control part 351 determines to calculate the average torque and the average amount of loss every n/m×gear ratio (120/12×2=20) after the gear change detecting part 381 has detected a gear change. According to the result "Tk last time<Tk this time", the MM control part 351 determines that there is a gear change such that a gear with the smaller number of teeth is changed to a gear with the greater number of teeth, and therefore the rotation speed of the crank 105 decreases. If the step ST09-4 is performed, the processing in the step 09 by the MM control part 351 is ended.

In step ST09-5, the MM control part 351 determines to calculate the average torque and the average amount of loss every n/m(120/12=10) until the gear change detecting part 381 detects a gear change. Moreover, the MM control part 351 determines to calculate the average torque and the average amount of loss every n/(m×gear ratio) (120/(12×2)=5) after the gear change detecting part 381 detects a gear change. According to the result "Tk last time>Tk this time", the MM control part 351 determines there is a gear change such that a gear with the greater number of teeth is changed to a gear with the smaller number of teeth, and therefore the rotation speed of the crank 105 increases. If the step ST09-5 is performed, the processing in the step 09 by the MM control part 351 is ended.

In this way, the cycle computer (CC) 201 can calculate the average power and the average amount of loss every interval with 30 degrees, which is obtained by dividing 360 degrees by twelve.

With Embodiment 2, it is possible to reduce the capacity of the MM storage part 353 (MM RAM 355), and therefore provide an advantageous effect of reducing the cost. In addition, with Embodiment 2, the cycle computer (CC) 201 can calculate the average power and the average amount of loss every each interval with 30 degrees, which is obtained by dividing 360 degrees by twelve. That is, the cycle computer (CC) 201 can display the average power and the average amount of loss every interval that is properly divided.

Embodiment 3

With Embodiment 2, it is difficult to support a plurality of gears. In addition, with Embodiment 2, the average power and the average amount of loss can be calculated only after the crank 105 passes through the magnet 311a. Moreover, with Embodiment 2, the capacity of the MM storage part 353 has to be designed to support a change in the gear ratio. With Embodiment 3, these problems will be addressed.

Figure 11:
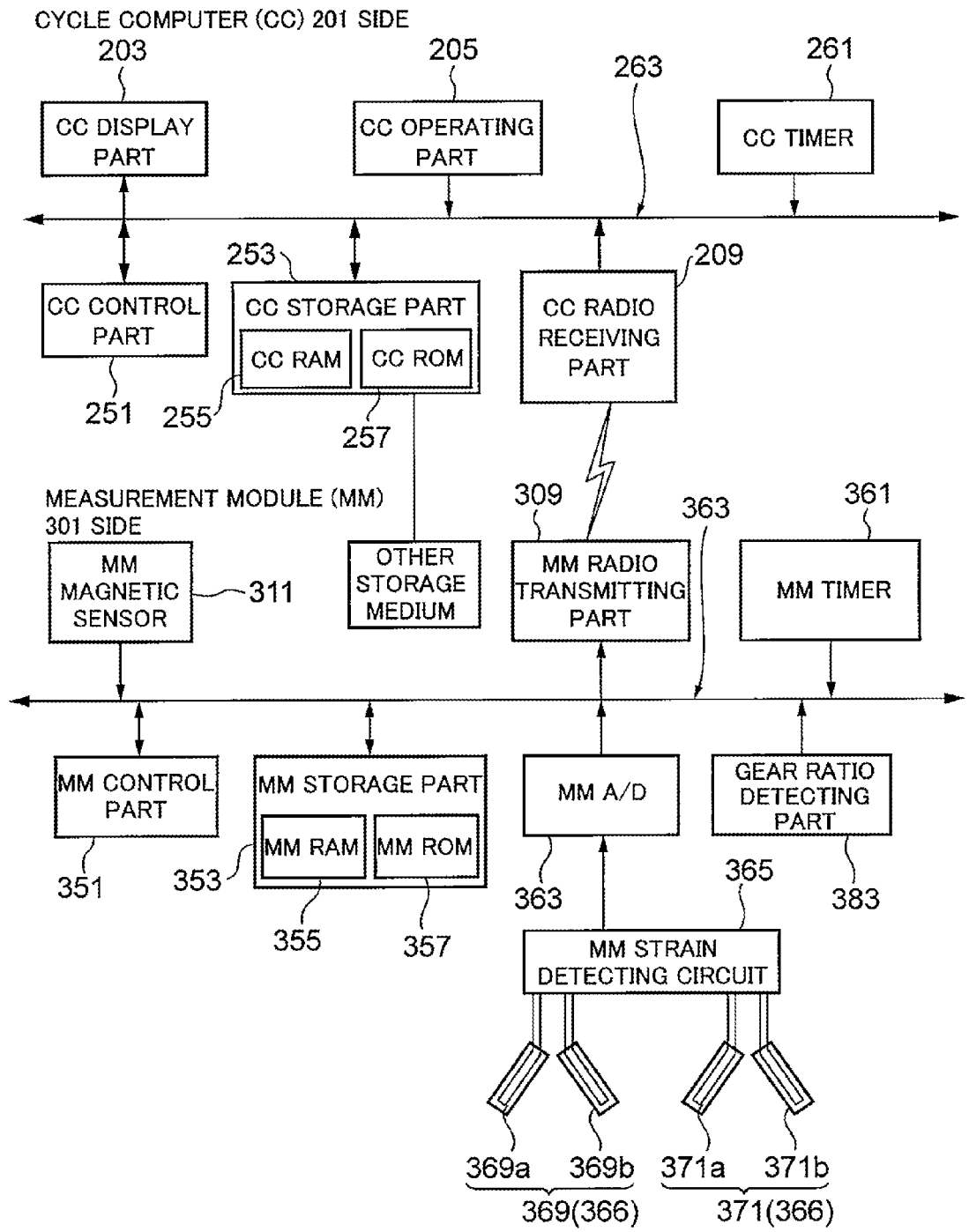
FIG. 11 is a block diagram showing the cycle computer (CC) and the measurement module (MM) according to Embodiment 3.

FIG. 11 is a block diagram showing the cycle computer (CC) 201 and the measurement module (MM) 301 according to Embodiment 3.

FIG. 11 is basically the same as FIG. 3, and therefore overlapping descriptions will be omitted. As shown in FIG. 11, the measurement module (MM) 301 has a gear ratio detecting part 383. The gear ratio detecting part 383 can recognize the number of teeth of the changed gear. Therefore, when there is a gear change, it is possible to estimate how much the rotation speed of the crank 105 is changed.

The reason why the gear ratio detecting part 383 is provided is that it is assumed that the gear has been changed if the rotation speed of the crank 105 is significantly changed. Here, when the speed of the bicycle 1 is significantly changed, the rotation speed of the crank 105 is also significantly changed. However, normally, the speed of the bicycle is not rapidly changed, and therefore it is assumed that the speed of the bicycle 1 is mostly unchanged here. Here, with Embodiment 3, it is assumed that the gear has a plurality of states.

Figure 12:
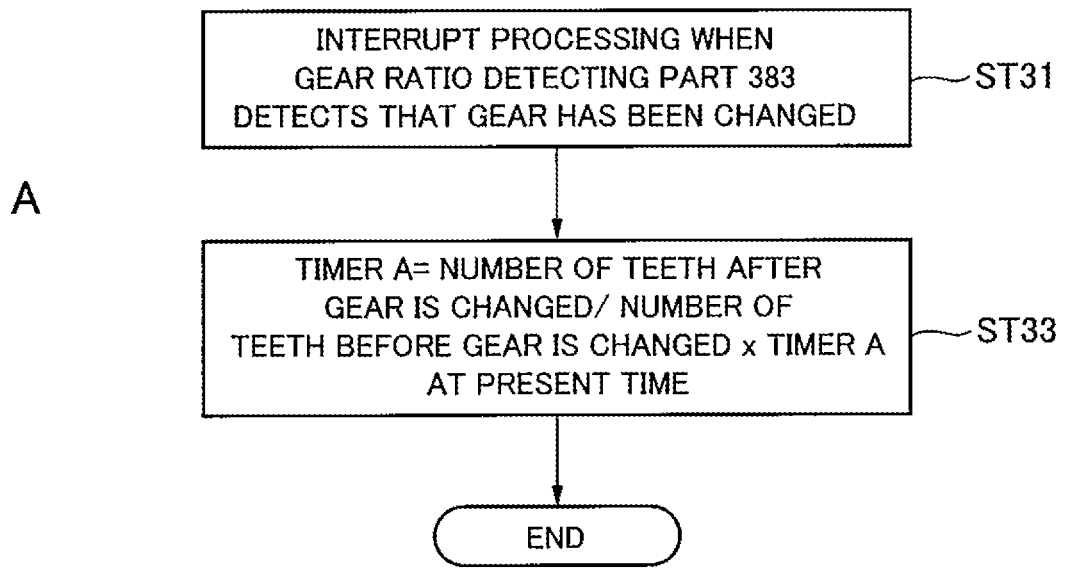
FIG. 12 is a flowchart of processing according to Embodiment 3.
Figure 12:
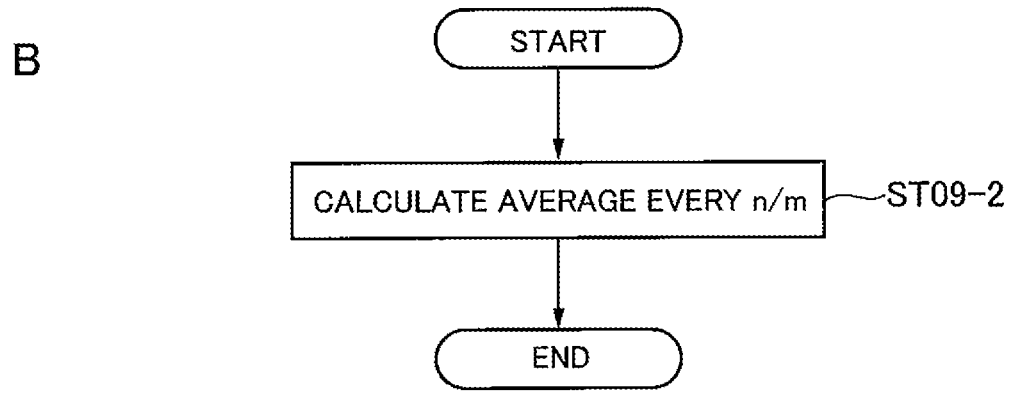

FIG. 12 is a flowchart of processing according to Embodiment 3.

FIG. 12A shows interrupt processing added to the flowchart shown in FIG. 6. As shown in FIG. 12A, the MM control part 351 performs the interrupt processing when the gear ratio detecting part 383 detects that there is a gear change (step ST31). Then, in step ST33, sampling time "Timer A" is set as follows.

Timer A=(the number of teeth after the gear change/
the number of teeth before the gear change)×
Timer A this time If it is assumed that the number of teeth before the gear change is 30 and the number of teeth after the gear change is 15, the rotation speed of the crank 105 doubles with the gear ratio 30/15. Therefore, by decreasing Timer A by half, it is possible to calculate the average power and the average amount of loss every 30 degrees even if the number of times of sampling is not changed (ten). Here, "Timer A this time" is the value of Timer A, which has not been newly set and is rewritten in step ST33. After ending the step ST33, the MM control part 351 ends the interrupt processing in the step ST31.

FIG. 12B is a drawing explaining that the processing in the step ST09 is different from that in Embodiment 2. As shown in FIG. 12B, the processing in the step ST09 shown in FIG. 2 is different from that in Embodiment 2 (see also FIG. 10). The processing in the step ST09 shown in FIG. 6 is the same as in Embodiment 1.

In the step ST09-2 shown in FIG. 12B, the average torque and the average amount of loss are calculated every n/m (120/12=10). With the processing shown in FIG. 12A, the number of times of sampling is not changed even if there is a gear change. That is, in step ST33, Timer A is controlled in response to a change in the rotation speed of the crank 105, and therefore it is possible to perform sampling at a predetermined interval though the number of times of sampling is not changed.

In this way, with the Embodiment 3, it is possible to support a plurality of gears. In addition, with Embodiment 3, it is possible to calculate the average power and the average amount of loss before the crank 105 passes through the magnet 311a. Moreover, with Embodiment 3, it is possible to minimize the amount of space of the MM storage part 353, and therefore reduce the cost.

Embodiment 4

With Embodiment 3, it is assumed that the speed of the bicycle 1 is mostly unchanged. However, there is no guarantee that the speed of the bicycle 1 is not suddenly changed. With Embodiment 4, this problem will be addressed.

Figure 13:
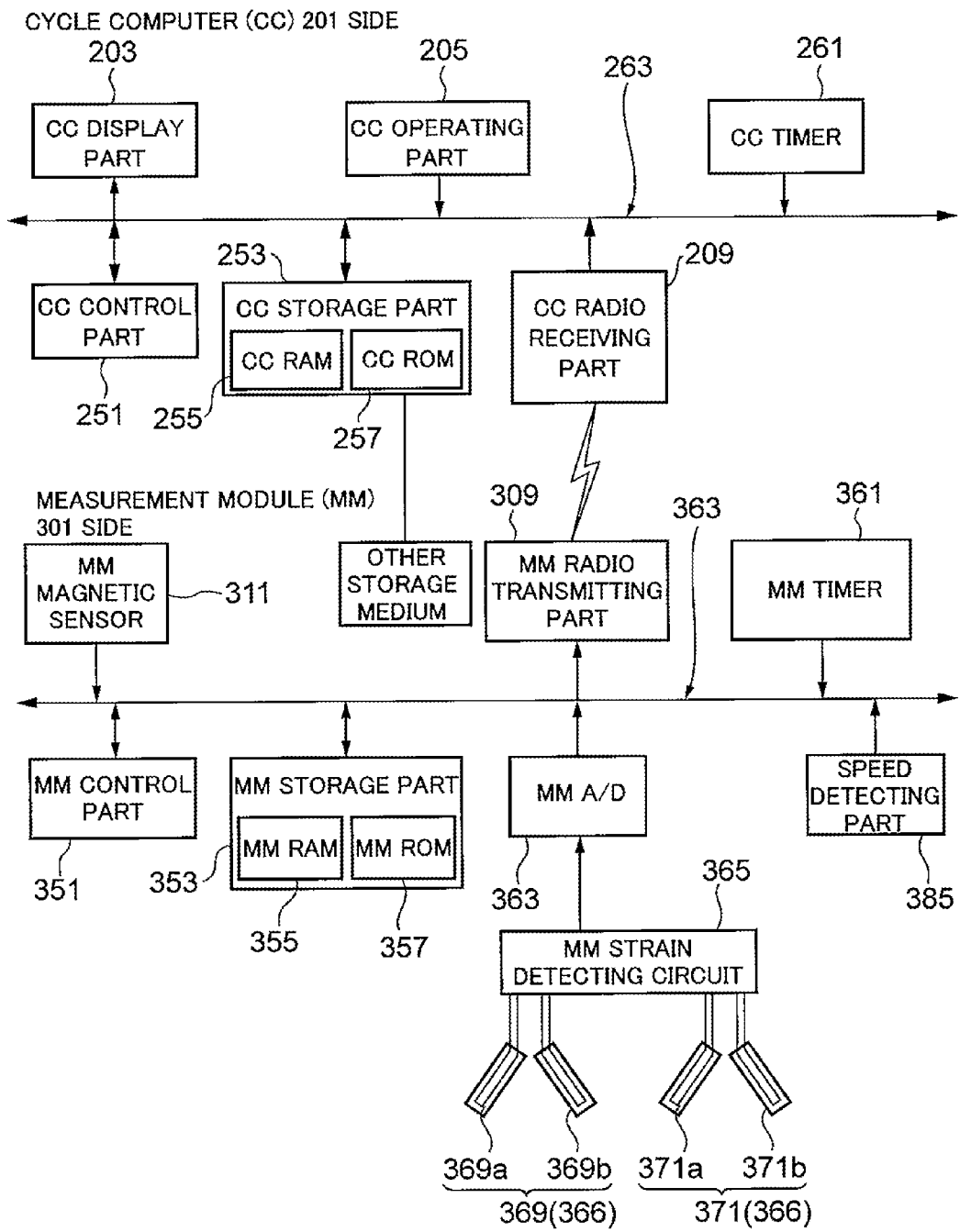
FIG. 13 is a block diagram showing the cycle computer (CC) and the measurement module (MM) according to Embodiment 4.

FIG. 13 is a block diagram showing the cycle computer (CC) 201 and the measurement module (MM) 301 according to Embodiment 4.

FIG. 13 is basically the same as FIG. 11, and therefore overlapping descriptions will be omitted. As shown in FIG. 13, the measurement module (MM) 301 has a speed detecting part 385. The speed detecting part 385 can detect the speed of the bicycle 1. The speed detecting part 385 is not limited as long as it has temporal resolution enough to measure the speed at a certain degree of precision while the crank 105 rotates 360 degrees. A cadence sensor with this feature may be used.

The reason why the speed detecting part 385 is provided that the rotation speed of the crank 105 is changed not only when there is a gear change but also when the speed of the bicycle 1 is changed.

Figure 14:
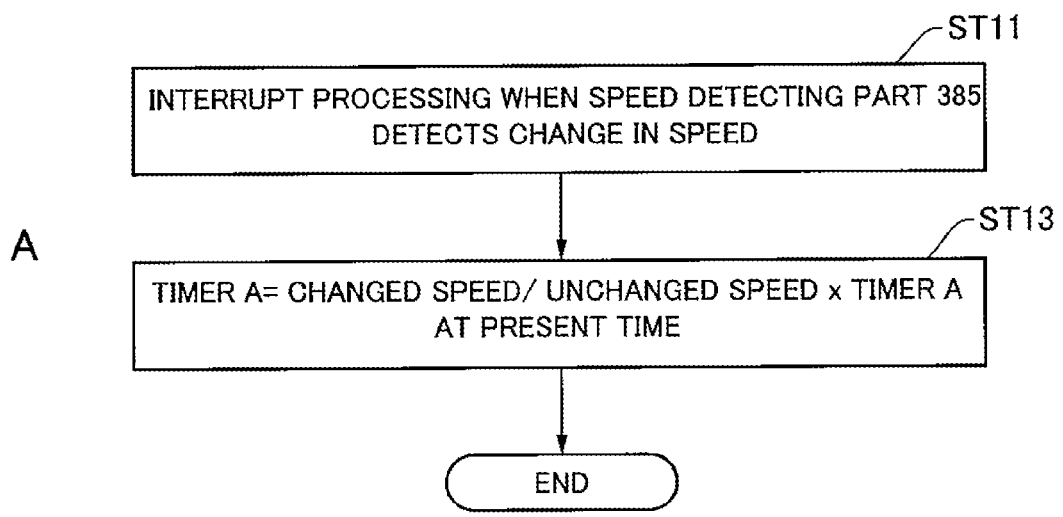
FIG. 14 is a flowchart of processing according to Embodiment 4.
Figure 14:
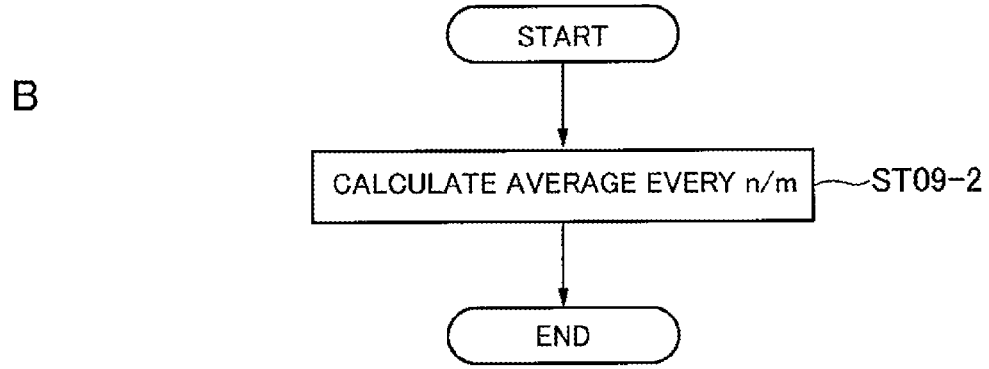

FIG. 14 is a flowchart of processing according to Embodiment 4.

FIG. 14 shows interrupt processing instead of the processing shown in FIG. 12A. As shown in FIG. 14, the MM control part 351 performs the interrupt processing when the speed detecting part 385 detects a change in the speed of the bicycle 1.

Then, in step ST13, sampling time "Timer A" is set as follows.

Timer A=(unchanged speed/changed speed)×Timer A this time

The speed detecting part 385 can detect the unchanged speed and the changed speed. Assumed that the unchanged speed is 3 m/s and the changed speed is 1.5 m/s, the rotation speed of the crank 105 doubles (3/1.5) due to the change in the speed, and therefore it is possible to calculate the average power and the average amount of loss every number of times of sampling (ten) by decreasing Timer A by half (½=1.5/3). After ending the processing in the step ST13, the MM control part 351 ends the interrupt processing in the step ST11.

In addition, as shown in FIG. 14B, the processing in the step ST09 is the same as in Embodiment 3.

In this way, with Embodiment 4, it is possible to support a change in the speed of the bicycle 1. Here, Embodiment 4 may be added to Embodiment 3. In this case, it is possible to support not only a change in the speed of the bicycle 1 but also a gear change.

The measurement module (MM) 301 according to the embodiments that measures the force applied to the bicycle 1 includes: the strain sensor 366 that detects the strain of the crank 105 of the bicycle 1, which transmits the force applied from the user through the crank 105 and one front gear 109 selected among one or more front gears 109; the MM magnetic sensor 311 that detects the crank 105 passing through a predetermined position; and the MM control part 351. The MM control part 351 calculates the rotation angle of the crank 105, based on the elapsed time from the time the crank 105 passes through a predetermined position, which is detected by the strain sensor 366, and associates the rotation angle of the crank 105 with the force applied to the crank 105 to calculate the distribution of the force applied from the user. With this configuration, it is possible to display to the user the average power and the average amount of loss that correspond to the position of the crank 105, and therefore provide the user with information indicating how the user applies the force to the pedal 103 of the bicycle 1.

The method of measuring the force applied to the bicycle 1 according to the embodiments includes: detecting the strain of the crank 105 of the bicycle 1, which transmits the force applied from the user through the crank 105 and one front gear 109 selected among one or more front gears 109; detecting the crank 105 passing through a predetermined position; calculating the rotation angle of the crank 105, based on the elapsed time from the time the crank 105 passes through the predetermined position; calculating the force applied to the crank 105 based on the strain amount of the crank 105; associating the rotation angle with the force applied to the clank; and calculating the distribution of the force applied from the user. With this method, it is possible to display to the user the average power and the average amount of loss that correspond to the position of the crank 105, and therefore provide the user with information indicating how the user applies the force to the pedal 103 of the bicycle 1.

The man-powered machine according to the present invention is a machine such as an exercise bike and so forth that has the crank 105 and is driven by humans. That is, the man-powered machine according to the present invention is not limited as long as the machine has the crank 105 and is driven by humans, and does not necessarily need to move between positions. The measurement apparatus according to the present invention may be part of the cycle computer (CC) 201 or formed separately from the cycle computer (CC) 201. Moreover, the measurement apparatus may include a plurality of units separately from each other. Another configuration is possible where components other than the strain sensor 366 are located in different places and communicate with each other by the Internet. The measurement module (MM) 301 is an example of the measurement apparatus according to the present invention. The MM magnetic sensor 311 is an example of the sensor according to the present invention. The sensor according to the present invention is not limited as long as it can detect the position of the crank 105. The front gear 109 and the rear gear 113 are examples of the gear according to the present invention. The gear according to the present invention is not limited as long as it can change the rotation speed of the crank 105. The MM control part 351 and the CC control part 251 are examples of the control part according to the present invention. The control part according to the present invention is not limited to as long as it has a control function. The distributed-control system may be adopted.

Although the preferred embodiment has been explained, it is by no means limiting. It will be appreciated that various modifications and alterations are possible.

REFERENCE SIGNS LIST 1 bicycle; 3 frame; 5 front wheel; 5a front spoke; 7 rear wheel; 7a rear spoke; 9 handle; 11 saddle; 13 front fork; 101 drive mechanism; 103 pedal; 104 crank mechanism; 105 crank; 107 crankshaft; 109 front gear; 111 chain; 113 rear gear; 115 pedal crankshaft; 117 upper/lower surface part; 119 side surface part; 201 cycle computer (CC); 203 CC display part; 205 CC operating part; 207 CC cadence radio receiving part; 209 CC radio receiving part; 251 CC control part; 253 CC storage part; 261 CC timer; 301 measurement module (MM) (measurement apparatus); 309 MM radio transmitting part; 311 MM magnetic sensor; 311a magnet; 351 MM control part; 353 MM storage part; 361 MM timer; 363 MM A/D; 365 MM strain detecting circuit; 366 strain sensor; 369 upper/lower surface strain gage set; 369a first upper/lower surface strain gage; 369b second upper/lower surface strain gage; 371 side surface strain gage set; 371a first side surface strain gage; 371b second side surface strain gage; 381 gear change detecting part; 383 gear ratio detecting part; 385 speed detecting part

The invention claimed is:

1. A measurement apparatus that measures force being applied to a man-powered machine, comprising:
   a strain detecting part that detects strain of a crank of the man-powered machine configured to transmit force being applied from a user through the crank and one gear selected among one or more gears;
   a sensor that detects the crank passing through a predetermined position; and
   a control part,
   wherein:
   the control part calculates a rotation angle of the crank based on an elapsed time from a time the crank passes through the predetermined position that the sensor has detected;
   the control part calculates force applied to the crank based on a strain amount of the crank that the strain detecting part has detected;

the control part associates the rotation angle with the force applied to the crank to calculate distribution of the force applied from the user;

the crank connects a pedal and a crankshaft; and the strain detecting part is disposed on the crank.

2. The measurement apparatus according to claim 1, further comprising a gear ratio detecting part that detects a gear ratio of a selected gear among two or more gears, wherein when the gear ratio detecting part detects a change in the gear ratio, a sampling period detected by the strain detecting part is changed according to the gear ratio.

3. The measurement apparatus according to claim 1, further comprising a speed detecting part that detects a speed of the man-powered machine, wherein when the speed detecting part detects a change in the speed, a sampling period detected by the strain detecting part is changed according to the speed.

4. A measurement apparatus that measures force being applied to a man-powered machine, comprising:

a strain detecting part that detects strain of a crank of the man-powered machine configured to transmit force being applied from a user through the crank and a gear selected from plural gears;

a gear change detecting part that detects whether or not there is a gear change in a selected gear among the plural gears;

a sensor that detects the crank passing through a predetermined position; and a control part, wherein:

the control part calculates a rotation angle of the crank based on an elapsed time from a time the crank passes through the predetermined position that the sensor has detected, the control part calculates force applied to the crank based on a strain amount of the crank that the strain detecting part has detected, the control part associates the rotation angle with the force applied to the crank to calculate distribution of the force applied from the user, and wherein the control part calculates the rotation angle of the crank based on the elapsed time from the time the crank passes through the predetermined position that the sensor has detected, and an elapsed time from a time the gear change detecting part detects the gear change.

5. A method of measuring force applied to a man-powered machine, comprising:

detecting strain of a crank of the man-powered machine configured to transmit force being applied from a user through the crank and one gear selected among one or more gears, wherein the crank connects a pedal and a crankshaft, and wherein the step of detecting stain is carried out on the crank;

detecting the crank passing through a predetermined position;

calculating a rotation angle of the crank based on an elapsed time from a time the crank passes through the predetermined position;

calculating force applied to the crank based on a strain amount of the crank; and associating the rotation angle with the force applied to the crank to calculate distribution of the force applied from the user.

6. The method according to claim 5, further comprising detecting whether or not there is a gear change in a selected gear among two or more gears, wherein the rotation angle of the crank is calculated based on the elapsed time from the time the crank passes through the predetermined position, and an elapsed time from a time the gear change is detected.

7. The method according to claim 5, further comprising detecting a gear ratio of a gear selected among two or more gears, wherein when a change in the gear ratio is detected, a sampling period is changed based on the gear ratio.

8. The method according to claim 5 further comprising, detecting a speed of the man-powered machine, wherein when a change in the speed is detected, a sampling period is changed based on the speed.

* * * * *